May 31, 1927.
H. YATES
1,630,880
CABLE SPLICER
Filed Feb. 16, 1927
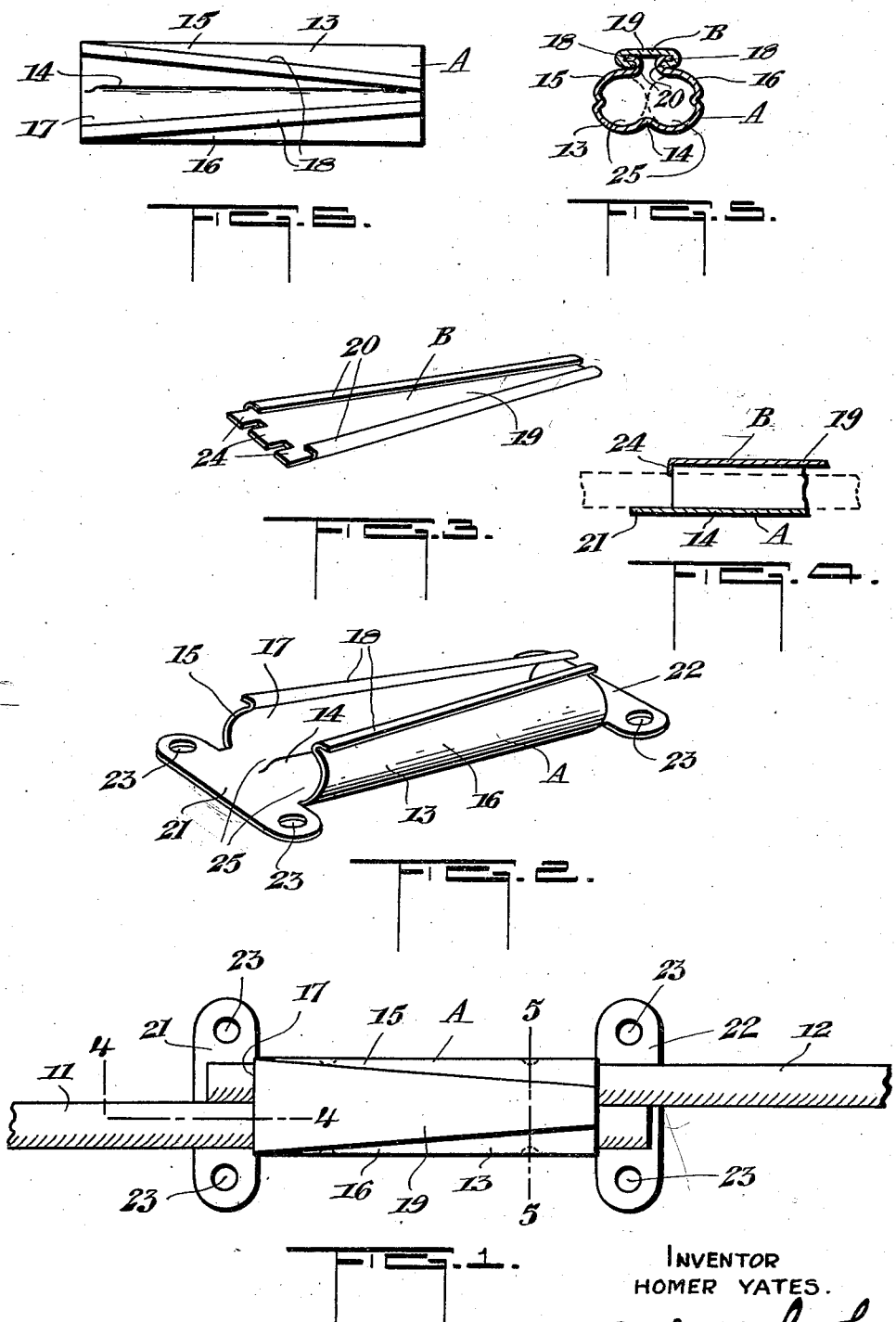
INVENTOR
HOMER YATES.
BY Fetherstonhaugh & Co.
ATT'YS.

Patented May 31, 1927.

1,630,880

UNITED STATES PATENT OFFICE.

HOMER YATES, OF REGINA, SASKATCHEWAN, CANADA.

CABLE SPLICER.

Application filed February 16, 1927. Serial No. 168,631.

This invention relates to improvements in cable splicers and the objects of the invention are to provide a simply constructed and durable device of this character for connecting or splicing cables in the form of a splicer and disperser designed to connect two metal cables together and more particularly designed for lightning rod cables.

With the foregoing and other objects hereinafter more fully referred to in view the invention comprises a metal bracket member substantially trough shaped and ribbed to engage with the ends of two cables in parallel relationship to one another, adapted to fit snugly around both cables, pressing them together to provide a satisfactory and lasting electrical connection, the open top of the trough being substantially V-shaped and flanged to slidably engage with a cover.

Referring now to the drawings in which like characters of reference indicate corresponding parts in each figure, Figure 1 is a plan view of the device connecting two metal cables.

Figure 2 is a perspective view of the splicer with the cover removed.

Figure 3 is a perspective view of the cover showing the retaining bendable lugs at one end.

Figure 4 is a section on the line 4—4 of Figure 1.

Figure 5 is a section on the line 5—5 of Figure 1.

Figure 6 is a plan view of a modified form of cover without the lugs.

Referring more particularly to the drawings in which a preferred example of my invention is disclosed, A designates the body of the splicer and B the cover. The body A is stamped from a single piece of metal, preferably similar to that composing the cables 11 and 12 to be connected or spliced, and consists of a body portion 13 with a central longitudinally extending rib 14 in the bottom thereof and provided with curved sides 15 and 16 adapted to form, with the rib, means for snugly engaging with the ends of the cable in parallel relationship to one another, as illustrated in Figure 1. It will also be noted that the sides 15 and 16 are open at the top in substantially V-shaped formation longitudinally or opened wider at one end 17 than at the opposite end and also that they are formed with flanges 18 to form guideways with a substantially V-shaped cover plate 19, as illustrated in Figure 3, formed with inwardly flanged sides 20 to slidably engage with the flanges 18. The body portion 13 is formed with extending ends 21 and 22 with orifices 23 therein whereby the device can be rigidly secured as may be required. It will also be noted that the cover member 19 normally detached is provided with lugs 24 on the wide end, these lugs being designed when the cover is in the position illustrated in Figure 1 to be bent to lock the cover securely on the body portion 13.

In operation the ends of the cables 11 and 12, the cover 19 being removed, are placed in the channels 25, formed by the rib 14, in the bottom of the body portion 13 in snug and parallel relationship to one another. The cover 19 is then slipped on over the narrow end of the body portion until it reaches the wide end when the lugs 24 are bent to lock it.

It will thus be seen that the connection is easily and quickly put on and may be made by simply bending the sides of the body 13 to fit any size of cable. It is especially adapted to lightning rod conductors where it is necessary to have a good firm electrical connection and is also adapted from its construction to fit snugly around both cables clamping them together.

In Figure 6 is disclosed a modified form of cover plate in which the lugs 24 are omitted.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A cable splicer stamped from a single sheet of metal to form a trough shaped body member with curved sides and open at the ends, the top of said member being open wider at one end than at the other end and the sides being bent back outwardly to form guideways or flanges, a cover plate corresponding in formation to the opening in the body and formed with flanges adapted to slidably engage with said guideways, and lugs formed in the end of the cover plate adapted to be bent to lock the plate on the body.

2. A cable splicer stamped from a single sheet of metal to form a trough shaped body member with curved sides and open at the ends, the top of said member being open wider at one end than at the other end and the sides being bent back outwardly to form guideways or flanges, a cover plate corresponding in formation to the opening in the body and formed with flanges adapted to slidably engage with said guideways, lugs formed in the end of the cover plate adapted to be bent to lock the plate on the body, and means formed integral with the body portion for securing the device.

3. A device of the character described and in combination, a single piece of metal bent to form curved sides having top flanges thereon, a longitudinally extending bead in the bottom of said bent piece of metal adapted in combination with said sides to form parallel channels to engage with the ends of two cables to be spliced, a cover plate adapted to slidably engage with said flanges.

4. A device of the character described and in combination, a single piece of metal bent to form curved sides having top flanges thereon, a longitudinally extending bead in the bottom of said bent piece of metal adapted in combination with said sides to form parallel channels to engage with the ends of two cables to be spliced, a cover plate adapted to slidably engage with said flanges, and means integral with the cover plate for locking it.

In witness whereof I have hereunto set my hand.

HOMER YATES.